US012179481B2

(12) United States Patent
Murata

(10) Patent No.: US 12,179,481 B2
(45) Date of Patent: Dec. 31, 2024

(54) LIQUID EJECTING DEVICE AND LIQUID EJECTING METHOD

(71) Applicant: SEIKO EPSON CORPORATION, Tokyo (JP)

(72) Inventor: Masahiro Murata, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 197 days.

(21) Appl. No.: 18/146,476

(22) Filed: Dec. 27, 2022

(65) Prior Publication Data

US 2023/0202166 A1 Jun. 29, 2023

(30) Foreign Application Priority Data

Dec. 28, 2021 (JP) ................................ 2021-214472

(51) Int. Cl.
*B41J 2/045* (2006.01)

(52) U.S. Cl.
CPC ....... *B41J 2/04558* (2013.01); *B41J 2/04586* (2013.01)

(58) Field of Classification Search
CPC .. B41J 2/04558; B41J 2/04586; B41J 2/2054; B41J 2/21
See application file for complete search history.

(56) References Cited

U.S. PATENT DOCUMENTS

2012/0313992 A1* 12/2012 Wada ................ B41J 11/00214 347/15

FOREIGN PATENT DOCUMENTS

JP 2011-031612 A 2/2011
JP 2011-121335 A 6/2011

* cited by examiner

*Primary Examiner* — Bradley W Thies
(74) *Attorney, Agent, or Firm* — Global IP Counselors, LLP

(57) ABSTRACT

A liquid ejecting device includes a liquid ejecting unit and a control unit configured to control ejection of liquid. A plurality of types of liquid include a first ink group that is capable of expressing a different color by mixing a plurality of color inks each other and a second ink capable of singly expressing a color of the same system as that of the different color. The control unit is capable of forming a first color mixture pattern and a second color mixture pattern that uses a greater amount of the first ink group than that of the first color mixture pattern to eject the first ink group, is capable of forming a monochrome pattern to eject the second ink, and forms a patch the second color mixture pattern that is adjacent to the first color mixture pattern and the monochrome pattern.

8 Claims, 9 Drawing Sheets

LIQUID EJECTING DEVICE AND LIQUID EJECTING METHOD

The present application is based on, and claims priority from JP Application Serial Number 2021-214472, filed Dec. 28, 2021, the disclosure of which is hereby incorporated by reference herein in its entirety.

BACKGROUND

1. Technical Field

The present disclosure relates to a liquid ejecting device and a liquid ejecting method.

2. Related Art

An ink jet recording system is disclosed that includes a recording head for ejecting ink and a controller for controlling the recording head, and that performs recording to a recording medium based on image data (see JP-A-2011-121335). JP-A-2011-121335 shows optical densities of patch images when patches are recorded in a recording medium in such a way that the duty, which is the ink application amount per unit area, is gradually increased for the black ink.

To form an image in a medium using a plurality of color inks, it is necessary to check whether desired color development is obtained as a result of ink ejection to the medium. According to JP-A-2011-121335, it is disclosed that the optical density increases as the duty is increased. However, when a plurality of color inks are mixed in an attempt to express a different color, a phenomenon may be observed in which the measured density decreases on the contrary as the duty increases. In the following, such a phenomenon is referred to as the density reversal phenomenon. In JP-A-2011-121335, the density reversal phenomenon is not considered. Thus, there is a demand for a technology that serves to check the condition for obtaining appropriate color development, including the occurrence or non-occurrence of the density reversal phenomenon.

SUMMARY

A liquid ejecting device configured to eject a plurality of types of liquid to a medium, the liquid ejecting device including a liquid ejecting unit including a plurality of nozzles each configured to eject a corresponding type of liquid of the plurality of types of liquid, and a control unit configured to control ejection of the plurality of types of liquid by the liquid ejecting unit, wherein the plurality of types of liquid include a first ink group formed of a plurality of color inks and configured to express a different color by mixing the plurality of color inks each other and a second ink configured to singly express a color of the same system as the different color, and the control unit is configured to form, on the medium, a first color mixture pattern using the first ink group and a second color mixture pattern using a greater amount of the first ink group than that used for the first color mixture pattern, by controlling the liquid ejecting unit to eject the first ink group, is configured to form, on the medium, a monochrome pattern using the second ink by controlling the liquid ejecting unit to eject the second ink, and forms, on the medium, a patch that includes the first color mixture pattern, the monochrome pattern, and the second color mixture pattern adjacent to the first color mixture pattern and the monochrome pattern.

A liquid ejecting method performed by a liquid ejecting device configured to eject a plurality of types of liquid to a medium, the plurality of types of liquid including a first ink group formed of a plurality of color inks and configured to express a different color by mixing the plurality of color inks each other and a second ink configured to singly express a color of the same system as the different color, the liquid ejecting method including a patch forming step of forming a patch on the medium by controlling a liquid ejecting unit that includes a plurality of nozzles each configured to eject a corresponding liquid of the plurality of types of liquid, wherein in the patch forming step, a first color mixture pattern formed by using the first ink group and a second color mixture pattern formed by using a greater amount of the first ink group than that used for the first color mixture pattern are configured to be formed on the medium by controlling the liquid ejecting unit to eject the first ink group, and a monochrome pattern formed by using the second ink is configured to be formed on the medium by controlling the liquid ejecting unit to eject the second ink, and the patch forming step includes forming a patch that includes the first color mixture pattern, the monochrome pattern, and the second color mixture pattern that is adjacent to the first color mixture pattern and the monochrome pattern is formed in the medium.

DESCRIPTION OF EXEMPLARY EMBODIMENTS

Embodiments of the present disclosure will be described below with reference to the accompanying drawings. Note that each of the drawings is merely illustrative for describing the present embodiment. Since the drawings are illustrative, proportions, shapes, and shades may not be correct, may not match each other, or may be partially omitted.

1. General Description of Device Configuration

Figure 1:
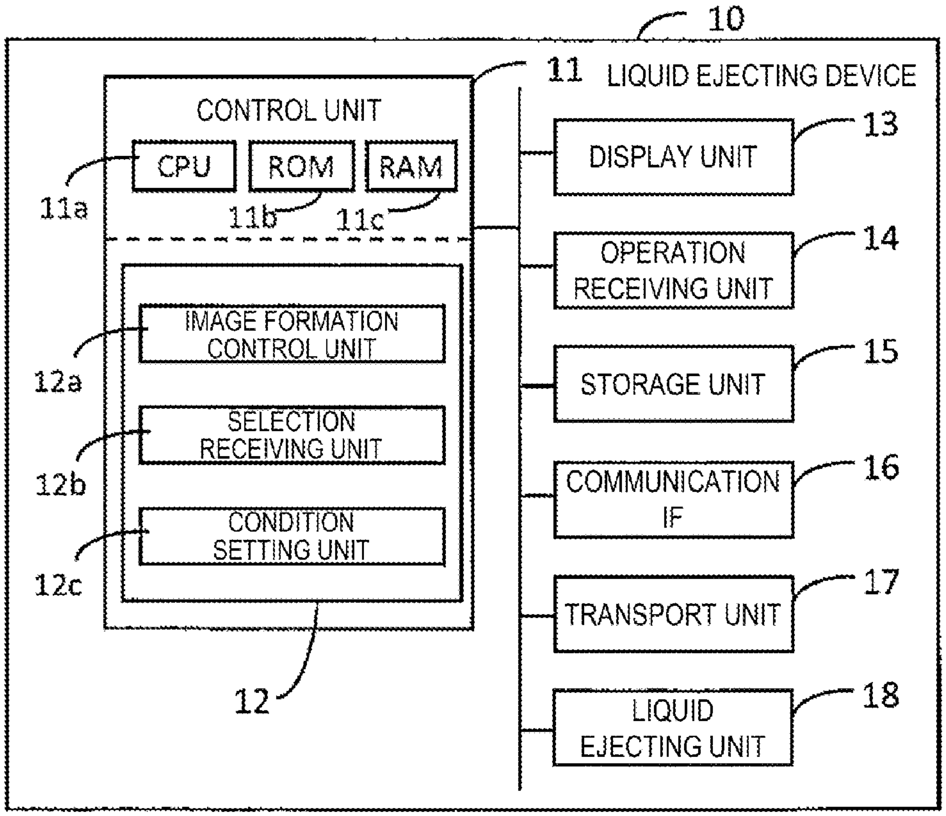
FIG. 1 is a block diagram illustrating a device configuration of the present embodiment in a simplified manner.

FIG. 1 illustrates the configuration of a liquid ejecting device 10 according to the present embodiment in a simplified manner. A liquid ejecting method according to the present embodiment is performed by the liquid ejecting device 10.

The liquid ejecting device 10 includes a control unit 11, a display unit 13, an operation receiving unit 14, a storage unit 15, a communication IF 16, a transport unit 17, a liquid ejecting unit 18, and the like. IF is an abbreviation for interface. The control unit 11 includes one or a plurality of integrated circuits (IC) including a central processing unit (CPU) 11*a* as a processor, a read-only memory (ROM) 11*b*, a random access memory (RAM) 11*c*, and the like, as well as any other non-volatile memory and the like.

In the control unit 11, the processor, that is, the CPU 11*a* executes arithmetic processing in accordance with a program 12 stored in the ROM 11*b*, any other memory, or the like by using the RAM 11*c* or the like as a work area, thereby realizing a variety of functions such as that of an image formation control unit 12*a*, a selection receiving unit 12*b*, and a condition setting unit 12*c*. The processor is not limited to a single CPU. A configuration may be adopted in which the processing is performed by a plurality of CPUs or a hardware circuit such as an application-specific integrated circuit (ASIC). Alternatively, a configuration may be adopted in which the processing is performed by a CPU and a hardware circuit that work in concert.

The display unit 13 is a means for displaying visual information. The display unit 13 is constituted, for example, by a liquid crystal display, an organic electroluminescence (EL) display, or the like. The display unit 13 may include a display and a driving circuit for driving the display. The operation receiving unit 14 is a means for receiving an input by a user. The operation receiving unit 14 is realized, for example, by a physical button, a touch panel, a mouse, a keyboard, or the like. Of course, the touch panel may be realized as a function of the display unit 13. The display unit 13 and the operation receiving unit 14 may be collectively referred to as the operation panel of the liquid ejecting device 10. The display unit 13 and the operation receiving unit 14 may be part of the configuration of the liquid ejecting device 10, or may be peripheral apparatuses externally coupled to the liquid ejecting device 10.

The storage unit 15 is, for example, a storage means by a hard disk drive, a solid state drive, or any other memory. Part of the memory included in the control unit 11 may be understood as the storage unit 15. The storage unit 15 may be understood as part of the control unit 11.

The communication IF 16 is a generic term for one or a plurality of IFs for the liquid ejecting device 10 to perform communication with an external device in a wired or wireless manner in conformance to a predetermined communication protocol including known communication standards. The external device is, for example, communication devices such as personal computers, servers, smartphones, and tablet terminals.

The transport unit 17 is a means for transporting a medium 30 along a predetermined transport direction under the control of the control unit 11. The transport unit 17 includes, for example, a roller that rotates to transport the medium 30, a motor as a power source of rotation, and the like. Furthermore, the transport unit 17 may be a mechanism that transports the medium 30 with the medium 30 mounted on a belt driven by a motor or a pallet. The medium 30 is, for example, paper. However, it is only required that the medium 30 is a medium that can be subjected to liquid ejection. The medium 30 may be of a material other than paper, such as a film or fabric.

The liquid ejecting unit 18 is a means for ejecting a plurality of types of liquid by an ink jet system under the control of the control unit 11 to form an image in the medium 30 transported by the transport unit 17. The liquid ejecting unit 18 includes a liquid ejecting head 20 and a carriage 21 to be described later. Droplets ejected from nozzles 22 of the liquid ejecting head 20 are referred to as dots. The liquid ejecting head 20 is capable of ejecting inks of colors such as cyan (C), magenta (M), yellow (Y), and black (K), for example. Of course, the liquid ejecting head 20 is also capable of ejecting color inks other than the CMYK inks or various liquids that do not fall under ink. The liquid ejecting head 20 may be referred to as a recording head, a printing head, a character printing head, an ink jet head, or the like. The liquid ejecting device 10 including the liquid ejecting head 20 may also be referred to as a recording device, a printing device, a character printing device, an ink jet printer, or the like.

The liquid ejecting device 10 may be realized by a single device, or may be realized by a system including a plurality of devices communicatively coupled to each other. For example, the liquid ejecting device 10 may be a system including an information processing device that plays the role of the control unit 11, and a device that includes the transport unit 17 and the liquid ejecting unit 18 and that performs liquid ejection under the control of the information processing device. In this case, the information processing device can be grasped as a control device, an image processing device, or the like.

Figure 2:
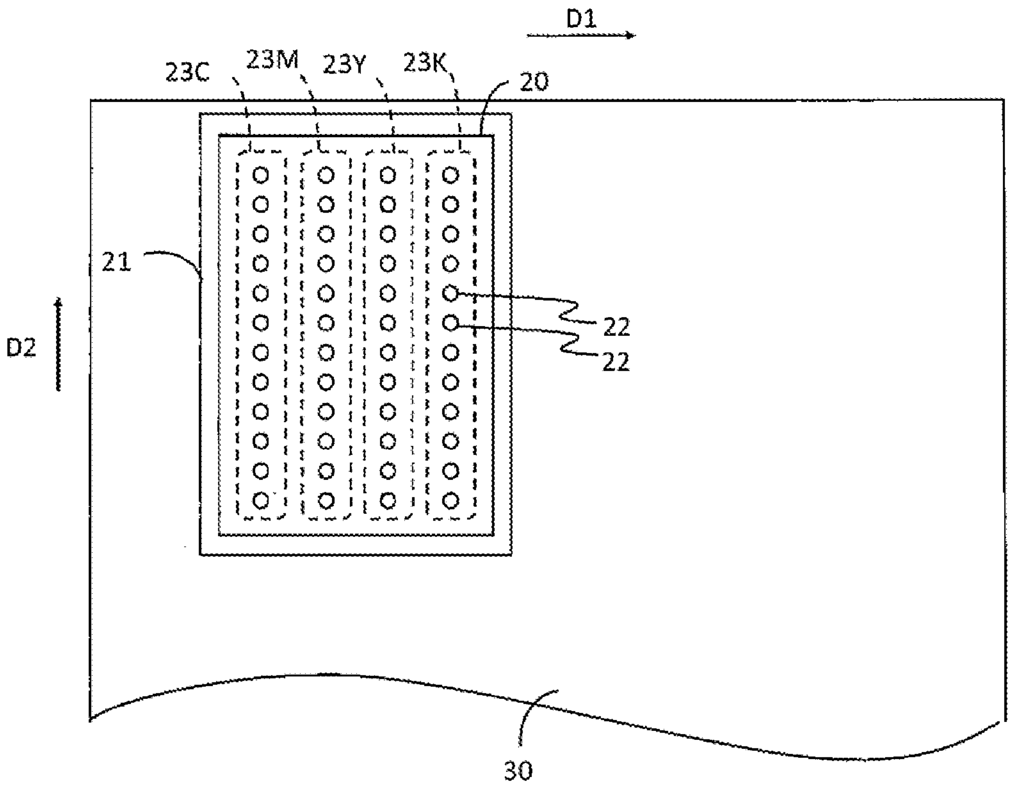
FIG. 2 is a view illustrating the relationship between a medium and a liquid ejecting head and the like as seen from above in a simplified manner.

FIG. 2 is a view illustrating the relationship between the medium 30 and the liquid ejecting head 20 and the like as seen from above in a simplified manner. According to FIG. 2, the liquid ejecting head 20 is mounted on the carriage 21. The carriage 21 is capable of reciprocating along a predetermined main scanning direction D1 under the control of the control unit 11, with power from a carriage motor (not illustrated). Therefore, the liquid ejecting head 20 moves forward and backward along the main scanning direction D1 along with the carriage 21.

The liquid ejecting head 20 includes a nozzle row for each type of liquid. In FIG. 2, four nozzle rows 23C, 23M, 23Y, and 23K are mentioned for simplification. Each of the white circles illustrated in FIG. 2 represents an individual nozzle 22. One nozzle row corresponding to one type of liquid is constituted by a plurality of nozzles 22 that are aligned with the nozzle pitch, which is the spacing between nozzles 22 in a direction intersecting the main scanning direction D1, being constant or substantially constant. The nozzle row 23C is a nozzle row including a plurality of nozzles 22 that eject the C ink. Similarly, the nozzle row 23M is a nozzle row including a plurality of nozzles 22 that eject the M ink; the nozzle row 23Y is a nozzle row including a plurality of nozzles 22 that eject the Y ink; and the nozzle row 23K is a nozzle row including a plurality of nozzles 22 that eject the K ink.

The control unit 11 causes the liquid ejecting head 20 to eject liquid to the medium 30 based on image data representing an image. As is known, in the liquid ejecting head 20, a driving element is provided for each nozzle 22. Application of a driving signal to the driving element of each nozzle 22 is controlled in accordance with image data. This causes each nozzle 22 to eject a dot or not to eject a dot, whereby an image represented by the image data is formed in the medium 30. The liquid ejection by the liquid ejecting head 20 that accompanies the movement of the carriage 21 is referred to as a pass, or is referred to as a scan.

The reference sign D2 indicates a transport direction D2 of the medium 30 by the transport unit 17. The transport unit 17 transports the medium 30 from upstream to downstream in the transport direction D2. Upstream and downstream in the transport direction D2 are simply referred to as upstream and downstream. The transport direction D2 intersects the main scanning direction D1. The intersection between the main scanning direction D1 and the transport direction D2 is orthogonal or substantially orthogonal. A plurality of nozzle rows included in the liquid ejecting head 20, such as the nozzle rows 23C, 23M, 23Y, and 23K, are aligned along the main scanning direction D1, and the positions of the plurality of nozzle rows in the transport direction D2 are identical to each other.

In such a configuration, the control unit 11 performs, in combination, the transport of the medium 30 by a predetermined distance by the transport unit 17, and passes by the carriage 21 and the liquid ejecting head 20 relative to the medium 30 that is at rest. In this way, an image by dots can be formed in the medium 30. Note that when any one of the main scanning direction D1 and the transport direction D2 that intersect each other is understood as the "first direction," the other is understood as the "second direction." Any of the directions D1 and D2 may be referred to as the first direction. However, in the description of FIG. 4 and the like to be described later, the main scanning direction D1 is referred to as the first direction, and the transport direction D2 is referred to as the second direction.

The plurality of types of liquid ejected by the liquid ejecting head 20 include a "first ink group" that is a plurality of color inks and that is capable of expressing a different color by being mixed with each other, and a "second ink" capable of singly expressing a color of the same system as that of the different color. According to the example of FIG. 2, the CMY inks are capable of expressing the so-called composite black by being mixed with each other, and thus correspond to the first ink group. Furthermore, the K ink singly expresses black, and thus corresponds to the second ink. Colors of the same system are related colors of which the hues are the same or closely resemble each other. Gray, composite black, and black are achromatic colors, and can be said to be colors of the same system. The relationship of being colors of the same system can also hold true even between chromatic colors.

2. First Embodiment

Next, a first embodiment will be described.

Figure 3:
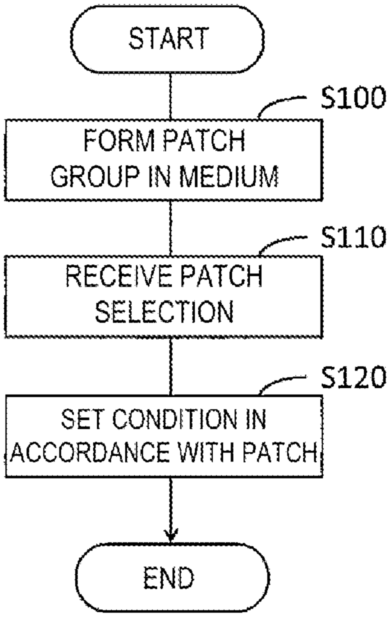
FIG. 3 is a flowchart illustrating processing performed by a control unit in the present embodiment.

FIG. 3 illustrates, by a flowchart, the processing executed by the control unit 11 in accordance with the program 12. Part or all of the flowchart represents the liquid ejecting method according to the present embodiment. In particular, step S100 corresponds to the "patch forming step," and this can be understood as one disclosure. In the following, step S100 will be described first, and then steps S110 and S120 will be briefly described.

In step S100, the image formation control unit 12*a* of the control unit 11 forms a "patch group," which is a collection of patches, in the medium 30 based on the image data. The image formation control unit 12*a* acquires predetermined patch image data representing the patch group from a storage location of image data such as the storage unit 15 and a memory inside or outside the liquid ejecting device 10. The format of the patch image data at the time of acquisition is not particularly limited. The image formation control unit 12*a* converts the acquired patch image data into data in the format used for liquid ejection by the liquid ejecting head 20. As used herein, conversion means data conversion processing, halftone processing, or the like. Data in the format used for liquid ejection means data in which the presence or absence of a dot is defined per pixel and for each of the ink colors of CMYK. Presence of a dot means a dot is to be ejected. Absence of a dot means that no dot is to be ejected. In addition, the image formation control unit 12*a* controls the liquid ejecting head 20 in accordance with the converted patch image data, and causes each nozzle 22 of each nozzle row to eject necessary dots in passes, thereby forming a patch group in the medium 30.

In the present embodiment, the image formation control unit 12*a* can control the liquid ejecting unit 18 to eject the first ink group, and thereby form a "first color mixture pattern" that uses the first ink group and a "second color mixture pattern" that uses a greater amount of the first ink group than that of the first color mixture pattern in the medium. In addition, the image formation control unit 12*a* can control the liquid ejecting unit 18 to eject the second ink, and thereby form a "monochrome pattern" that uses the second ink in the medium 30.

Figure 4:
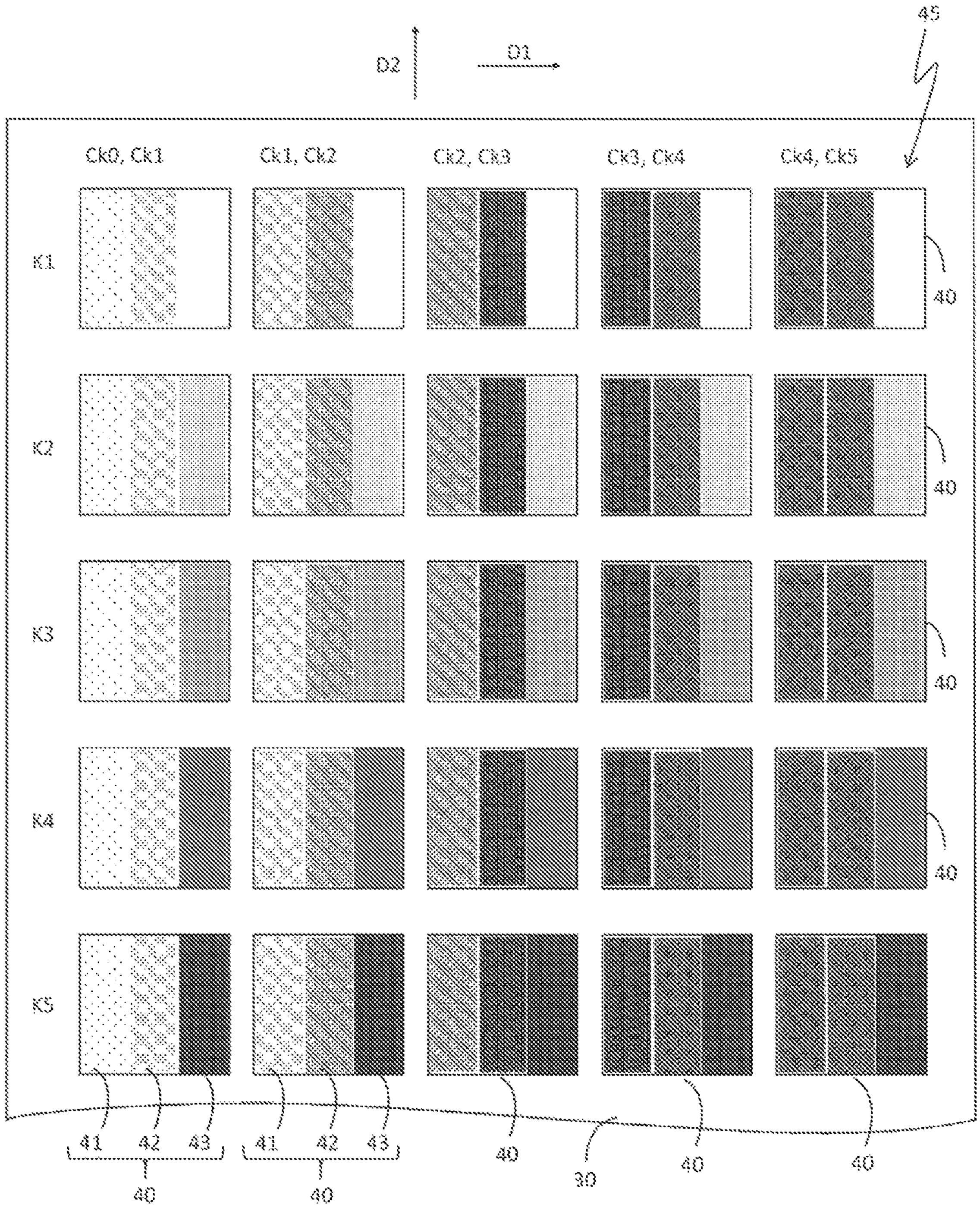
FIG. 4 is a view illustrating an example of a patch group printed in a medium.

FIG. 4 illustrates an example of a patch group 45 formed in the medium 30 by step S100. In other words, the patch image data described above is data representing the patch group 45. The patch group 45 is constituted by a plurality of patches 40 two-dimensionally aligned along each of the main scanning direction D1 and the transport direction D2. In the example of FIG. 4, a total of 25 patches 40 are illustrated, with five aligned along the main scanning direction D1 and five aligned along the transport direction D2. Of course, the number of patches 40 constituting the patch group 45 need not be limited to 25.

Each of the plurality of patches 40 includes a first color mixture pattern 41, a second color mixture pattern 42, and a monochrome pattern 43. Furthermore, in the patches 40, the second color mixture pattern 42 adjoins the first color mixture pattern 41 and the monochrome pattern 43. In the example of FIG. 4, the three patterns in each patch 40 are aligned in the main scanning direction D1 in the order of the first color mixture pattern 41, the second color mixture pattern 42, and the monochrome pattern 43. According to the above description, each of the first color mixture pattern 41 and the second color mixture pattern 42 is a composite black pattern obtained by mixing the CMY inks, and the monochrome pattern 43 is a black pattern by the K ink. In the example of FIG. 4, the area ratio of the first color mixture pattern 41, the second color mixture pattern 42, and the monochrome pattern 43 that constitute one patch 40 is approximately 1:1:1. However, such an area ratio need not be adopted.

In FIG. 4, Ck0 and Ck1, Ck1 and Ck2, Ck2 and Ck3, Ck3 and Ck4, and Ck4 and Ck5 mentioned at the position of the respective patches 40 along the main scanning direction D1 indicate the ink amount of the CMY inks used to form the first color mixture pattern 41 and the ink amount of the CMY inks used to form the second color mixture pattern 42, respectively. Furthermore, K1, K2, K3, K4, and K5 mentioned at the position of the respective patches 40 along the transport direction D2 indicates the ink amount of the K ink used to form the monochrome pattern 43. The ink amount of the CMY inks may be referred to as the ink amount of composite black. The ink amount may also be referred to as the duty.

The ink amount is the amount of ink ejected per unit area. For example, the ink amount of the CMY inks in one first color mixture pattern 41 can be expressed by the ratio of the total number of dots of the CMY inks for forming the first color mixture pattern 41 to the number of pixels in one first color mixture pattern 41 represented by the patch image data. If dots of all the CMY inks are formed at all pixels of one first color mixture pattern 41 based on the patch image data, the ink amount of the CMY inks in this first color mixture pattern 41 is 300%. Similarly, the ink amount of the CMY inks in one second color mixture pattern 42 can be expressed by the ratio of the total number of dots of the CMY inks for forming the second color mixture pattern 42 to the number of pixels in one second color mixture pattern 42 represented by the patch image data. Furthermore, the ink amount of the K ink in one monochrome pattern 43 can be expressed by the ratio of the number of dots of the K ink for forming the monochrome pattern 43 to the number of pixels in one monochrome pattern 43 represented by the patch image data, and takes a value of 0 to 100%.

The size relationship among the ink amounts Ck0, Ck1, Ck2, Ck3, Ck4, and Ck5 of the CMY inks is Ck0<Ck1<Ck2<Ck3<Ck4<Ck5. Furthermore, the size relationship among the ink amounts K1, K2, K3, K4, and K5 of the K ink is K1<K2<K3<K4<K5. The mention of the ink amounts Ck0, Ck1, Ck2, Ck3, Ck4, and Ck5 as well as the ink amounts K1, K2, K3, K4, and K5 may be actually printed in the medium 30 along with the patch group 45, or may be not printed. Furthermore, when the ink amounts Ck0, Ck1, Ck2, Ck3, Ck4, Ck5 as well as the ink amounts K1, K2, K3, K4, and K5 are printed in the medium 30 along with the patch group 45, these ink amounts may be, as a matter of course, specific numerical values such as 30% and 120%, for example.

As can be seen from FIG. 4, for the patches 40 that are at the same position in the main scanning direction D1, the first color mixture patterns 41 have the same ink amount, and the second color mixture patterns 42 have the same ink amount. Furthermore, for the patches 40 that are at the same position in the transport direction D2, the monochrome patterns 43 have the same ink amount. In FIG. 4, for example, the lowest leftmost patch 40 corresponding to the ink amounts Ck0, Ck1, and K5 is a patch formed with the ink amount of the CMY inks of the first color mixture pattern 41 being set to Ck0, the ink amount of the CMY inks of the second color mixture pattern 42 being set to Ck1, and the ink amount of the K ink of the monochrome pattern 43 being set to K5. Similarly, for example, the uppermost rightmost patch 40 corresponding to the ink amounts Ck4, Ck5, and K1 is a patch formed with the ink amount of the CMY inks of the first color mixture pattern 41 being set to Ck4, the ink amount of the CMY inks of the second color mixture pattern 42 being set to Ck5, and the ink amount of the K ink of the monochrome pattern 43 being set to K1.

In the following, to distinguish patches 40, the ink amount of the first color mixture pattern 41, the ink amount of the second color mixture pattern 42, and the ink amount of the monochrome pattern 43 may be mentioned together. For example, the lowest leftmost patch 40 described above will be mentioned as the patch 40 (Ck0, Ck1, K5). Turning now to two patches 40 aligned along the main scanning direction D1, for example, the patch 40 (Ck0, Ck1, K1) and the patch 40 (Ck1, Ck2, K1), the total ink amount of the CMY inks used to form the first color mixture pattern 41 and the second color mixture pattern 42 is, as a matter of course, greater for the patch 40 (Ck1, Ck2, K1). Accordingly, when patches 40 are counted as the first, the second, . . . , in the main scanning direction D1, for example from left to right in FIG. 4, the image formation control unit 12*a* can be said to form the n-th patch 40 of a plurality of patches 40 aligned along the first direction using a greater amount of the first ink group compared to that of the n−1-th patch 40. In the example of FIG. 4, n is an integer of 2 to 5. Furthermore, as can be seen from FIG. 4, the second color mixture pattern 42 of the n−1-th patch 40 and the first color mixture pattern 41 of the n-th patch 40 are formed with the same ink amount.

Furthermore, turning now to two patches 40 aligned along the transport direction D2, for example, the patch 40 (Ck0, Ck1, K1) and the patch 40 (Ck0, Ck1, K2), the ink amount of the K ink used to form the monochrome pattern 43 is greater for the patch 40 (Ck0, Ck1, K2). Accordingly, when patches 40 are counted as the first, the second, . . . , in the transport direction D2, for example from downstream to upstream, the image formation control unit 12*a* can be said to form the m-th patch 40 of a plurality of patches 40 aligned along the second direction using a greater amount of the second ink compared to that in the m−1-th patch 40. In the example of FIG. 4, m is an integer of 2 to 5.

Next, a method of utilizing the patch group 45 formed in the medium 30 by such a step S100 will be described. The user visually evaluates the patch group 45 formed in the medium 30, and select patch 40 or patches 40 in which the first color mixture pattern 41, the second color mixture pattern 42, and the monochrome pattern 43 are increasingly higher in density in this order. High in density means dark. Low in density means bright. Typically, images formed only with the K ink are higher in density than composite black images. Thus, in the following, a patch 40 in which the first color mixture pattern 41, the second color mixture pattern 42, and the monochrome pattern 43 are increasingly higher in density in this order will be referred to as a "well color-developed patch" in the sense of a patch having a well-developed color.

Figure 5:
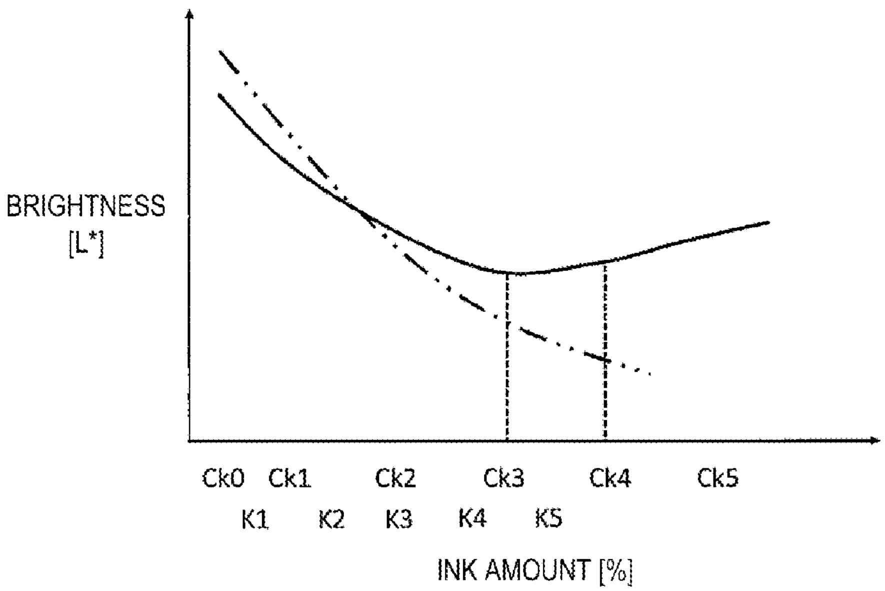
FIG. 5 is a graph illustrating the correspondence between the ink amount and luminosity of a pattern constituting a patch.

FIG. 5 illustrates the correspondence between the ink amount and luminosity of a pattern constituting a patch 40. In FIG. 5, the ink amounts Ck0, Ck1, Ck2, Ck3, Ck4, and Ck5 and the ink amounts K1, K2, K3, K4, and K5 described in FIG. 4 are indicated by the horizontal axis, and the brightness obtained when performing colorimetry of the respective patterns formed in the medium 30 with these ink amounts is indicated by the vertical axis. Brightness is the L* value in the L*a*b* color system. In FIG. 5, the brightness of the first color mixture pattern 41 and the second color mixture pattern 42 is indicated by a solid line, and the brightness of the monochrome pattern 43 is indicated by a two-dot-dash line.

According to FIG. 5, the brightness of the monochrome pattern 43 formed only with the K ink decreases as the ink amount of the K ink increases. In other words, the density of the monochrome pattern 43 also increases as the ink amount of the K ink increases. On the other hand, for the first color mixture pattern 41 and the second color mixture pattern 42 formed by mixing the CMY inks, when the ink amount of the CMY inks increases, the brightness decreases for a while. However, the brightness may start to increase with a certain ink amount as a border. According to the example of FIG. 5, the brightness corresponding to the ink amount Ck4 is higher compared to the brightness corresponding to the ink amount Ck3, meaning that the density reversal phenomenon occurred between the ink amount Ck3 and the ink amount Ck4.

Figure 6:
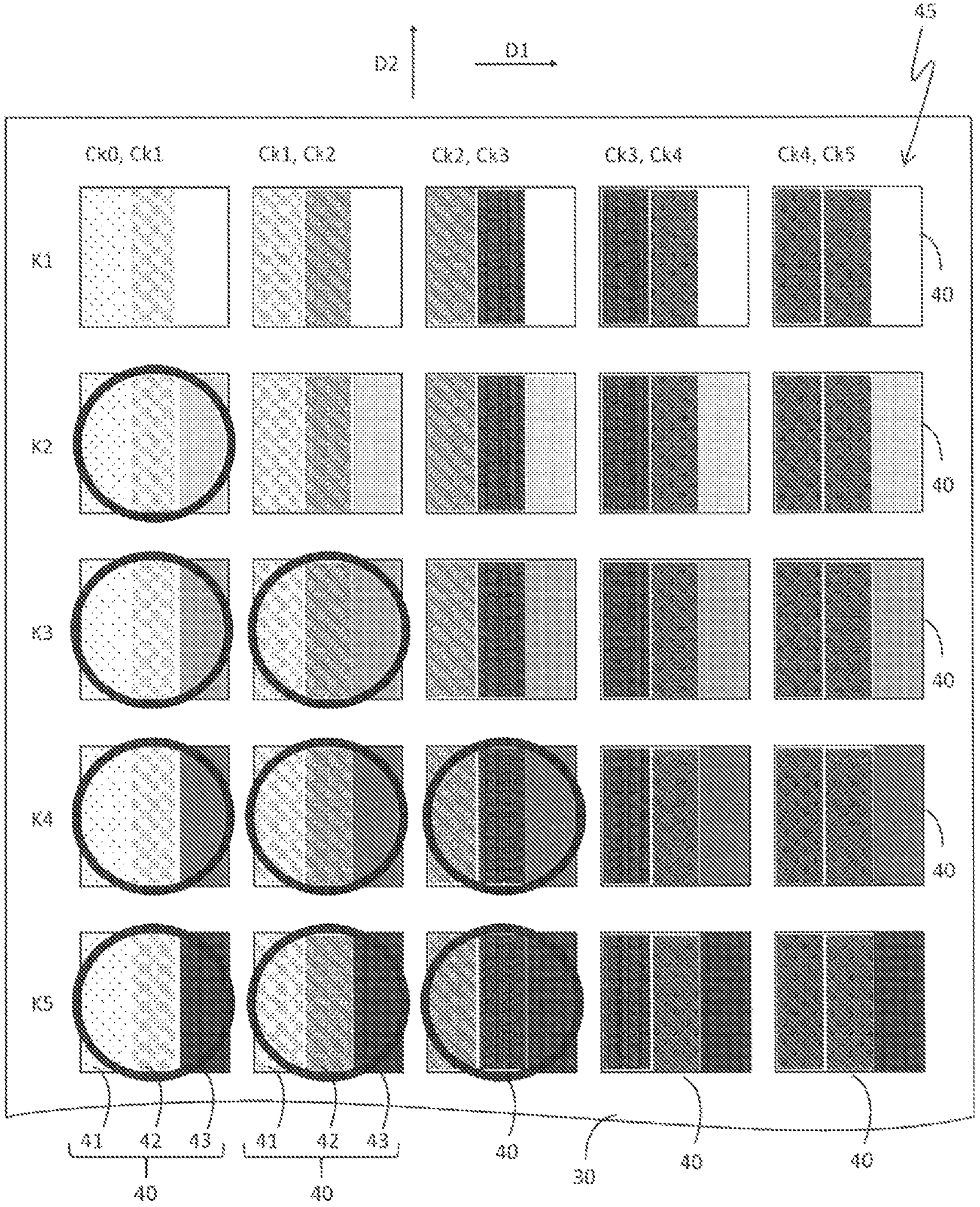
FIG. 6 is a view in which patches selected by a user from among the patch group are given a circle mark.

In FIG. 6, the patches 40 selected by the user from among the patch group 45 illustrated in FIG. 4 are given a circle mark. Each patch 40 given a circle mark is a patch 40 that the user found to be a well color-developed patch. The user need not actually give a circle mark to patches 40 on the medium 30. However, circle marks are given here to make the selection result easy to see.

In the present embodiment, colorimetry of the patch group 45 formed in the medium 30 in step S100 does not necessarily have to be performed. By visually observing the patch group 45, the user can, for each patch 40, compare the first color mixture pattern 41 and the second color mixture pattern 42 that adjoin each other, and compare the second color mixture pattern 42 and the monochrome pattern 43 that adjoin each other. Accordingly, if the density reversal phenomenon occurred in a certain patch 40, the user can recognize the same. In addition, well color-developed patches in which no density reversal occurred between the first color mixture pattern 41 and the second color mixture pattern 42 and in which the monochrome pattern 43 is higher in density than the second color mixture pattern 42 can be selected.

The user may select well color-developed patches by capturing an image of the patch group 45 formed in the medium 30 by a camera of a smartphone, a digital still camera, or the like, and evaluating image data obtained by such image capture or analyzing the image data by an application.

In step S110, the selection receiving unit 12*b* receives selection for the patches 40 formed in the medium 30 in step S100. In other words, the user operates the operation receiving unit 14 to input well color-developed patches selected from among the patch group 45 as described above, and the selection receiving unit 12*b* receives this input. The input method for the selection result of the patches 40 is not particularly limited. For example, if each patch 40 formed in the medium 30 was numbered in advance, the user only has to input via the operation receiving unit 14 all numbers of the patches 40 that were selected in the manner described above.

Alternatively, the selection receiving unit 12*b* may cause images of the patch group 45 to be displayed on the display unit 13 based on the patch image data. In addition, the user may input the selection result of the patches 40 by touching or otherwise selecting, from among patches in the image of the patch group 45 displayed on the display unit 13, the same patches as the patches 40 that were selected in the manner described above by visual observation of the patch group 45 formed in the medium 30.

In step S120, the condition setting unit 12*c* sets a condition to be employed in subsequent liquid ejection in accordance with the ink amount corresponding to the patches 40 of which the selection was received by the selection receiving unit 12*b* in step S110. Specifically, the condition setting unit 12*c* identifies, from among the selected patches 40, the patch 40 of which the ink amount of the first ink group and the ink amount of the second ink are the greatest. According to the example of FIG. 6, among the selected patches 40, the patch 40 of which the ink amount of the CMY inks and the ink amount of the K ink are the greatest is the patch 40 (Ck2, Ck3, K5). Accordingly, the condition setting unit 12*c* identifies the patch 40 (Ck2, Ck3, K5), and sets a condition with the identified patch 40 (Ck2, Ck3, K5) as a reference.

Instead of selecting and inputting all of the well color-developed patches, the user may select and input, from among these patches 40, only the patch 40 of which the ink amount of the first ink group and the ink amount of the second ink are the greatest. In this case, according to the example described above, the selection receiving unit 12*b* receives the selection of the patch 40 (Ck2, Ck3, K5) in step S110. When the selection receiving unit 12*b* receives the selection of only one patch 40 in step S110 in this manner, practically one patch 40 was identified. Thus, in step S120, the condition setting unit 12*c* can omit the processing for identifying one patch 40.

For example, the condition setting unit 12*c* sets the upper limit of the ink amount of the CMY inks for expressing composite black to the ink amount Ck3 of the second color mixture pattern 42 of the identified patch 40 (Ck2, Ck3, K5). Furthermore, the condition setting unit 12*c* may set the upper limit of the ink amount of the K ink for expressing black with the K ink to the ink amount K5 of the monochrome pattern 43 of the identified patch 40 (Ck2, Ck3, K5). According to such condition setting, the condition setting unit 12*c* can be said to have determined at least part of the ink amounts to be employed in subsequent liquid ejection. The condition setting unit 12*c* stores the condition set in this manner in a predetermined memory, and the flowchart of FIG. 3 is completed.

Thereafter, when performing liquid ejection based on image data arbitrarily designated by the user, the image formation control unit 12*a* causes the liquid ejecting unit 18 to eject liquid in compliance with the condition set by the condition setting unit 12*c*. Note that as the type of the medium 30 varies, the tint and density reproduced in the medium 30 vary. Accordingly, in step S120, the condition setting unit 12*c* sets a condition in association with the type of the medium 30 used in forming the patch group 45 in step S100. In addition, when performing liquid ejection based on image data arbitrarily designated by the user, the image formation control unit 12*a* only has to employ the condition set in association with the type of the medium 30 used.

3. Second Embodiment

Next, a second embodiment will be described. In the second embodiment, description common to the first embodiment is omitted as appropriate. In the second embodiment, in the patch forming step of step S100, the control unit 11 forms in patches 40 a "bleed determination unit" for determining ink bleed. The bleed determination unit includes a "first element" formed with the first ink group and a "second element" formed with the second ink.

Figure 7:
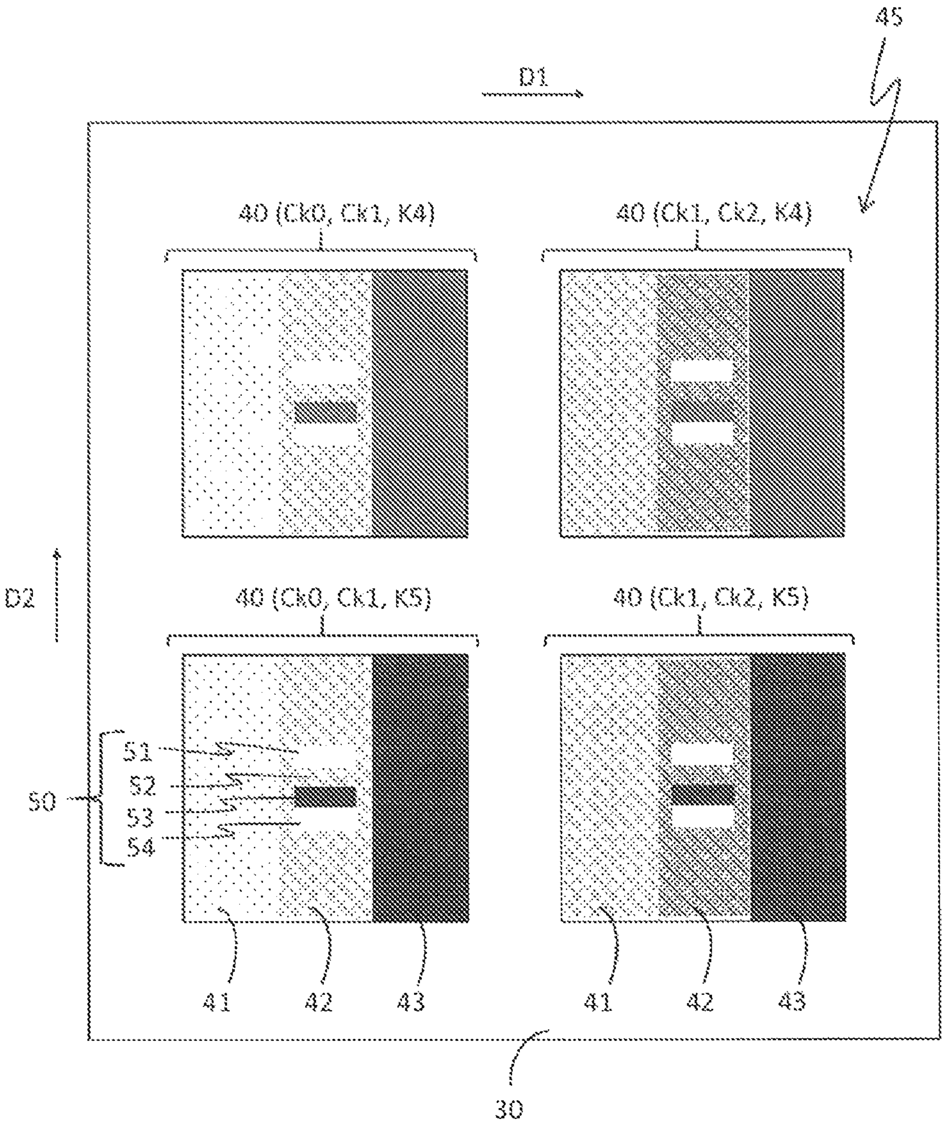
FIG. 7 is a view illustrating examples of patches printed in a medium in a second embodiment.

FIG. 7 illustrates a portion of the patch group 45 formed in the medium 30 based on the patch image data by step S100. In the examples of FIGS. 4 and 6, the patch group 45 includes 25 patches 40. In FIG. 7, some of these patches 40 are illustrated in an enlarged manner. Specifically, of the plurality of patches 40 formed in the medium 30, only the patch 40 (Ck0, Ck1, K4), the patch 40 (Ck1, Ck2, K4), the patch 40 (Ck0, Ck1, K5), and the patch 40 (Ck1, Ck2, K5) are illustrated in FIG. 7.

Each patch 40 includes the bleed determination unit 50. In other words, in the second embodiment, the image formation control unit 12*a* forms in the medium 30 patches 40 each including the bleed determination unit 50. The other patches 40 not illustrated in FIG. 7 equally include the bleed determination unit 50 as well. Furthermore, the description concerning the bleed determination unit 50 is common to any of the patches 40.

According to FIG. 7, the bleed determination unit 50 is a region where four elements adjoin each other in the order of a space element 51 that is a region to which no liquid is ejected, a first element 52, a second element 53, and a space element 54. The space elements 51 and 54 are regions where the surface of the medium 30 is exposed with no dots formed therein. The space elements 51 and 54 may be referred to as blank, or may be referred to as paper white. The bleed determination unit 50 is formed in the second color mixture pattern 42 constituting the patch 40. Therefore, the first element 52 is, of the second color mixture pattern 42, a region sandwiched between the space element 51 and the second element 53. However, the bleed determination unit 50 may be formed in the first color mixture pattern 41 constituting the patch 40. In this case, the first element 52 is, of the first color mixture patterns 41, a region sandwiched between the space element 51 and the second element 53.

The second element 53 of the bleed determination unit 50 is a region formed with the same amount of the K ink as that of the monochrome pattern 43 of the patch 40 including that bleed determination unit 50. Therefore, the second element 53 of the bleed determination unit 50 in the patch 40 (Ck0, Ck1, K5) is a region formed with the ink amount K5 of the K ink. In FIG. 7, the space element 51, the first element 52, the second element 53, and the space element 54 that constitute the bleed determination unit 50 are aligned along the transport direction D2, but may be aligned along the main scanning direction D1.

Furthermore, the bleed determination unit 50 may be formed in the monochrome pattern 43 constituting the patch 40. In this case, the first element 52 is a region formed with the same CMY ink amount as that of the second color mixture pattern 42 of the same patch 40. Of the monochrome pattern 43, the region sandwiched between the first element 52 and the space element 54 corresponds to the second element 53.

Even when a patch group 45 constituted by patches 40 each including the bleed determination unit 50 is formed in the medium 30 in this manner, the user selects well color-developed patches and inputs that selection result as in the first embodiment. In addition, in the second embodiment, the user evaluates the bleed determination unit 50 for each patch 40 formed in the medium 30, and selects patches 40 of which the bleed determination unit 50 is free from ink bleed. In the following, a patch 40 of which the bleed determination unit 50 is free from ink bleed is referred to as a "non-bleed patch." The space elements 51 and 54, the first element 52, and the second element 53 that constitute the bleed determination unit 50 are each a slim and small region compared to the first color mixture pattern 41, the second color mixture pattern 42, and the monochrome pattern 43 of the patch 40, and thus are difficult to distinguish when there is ink bleed.

Figure 8A:
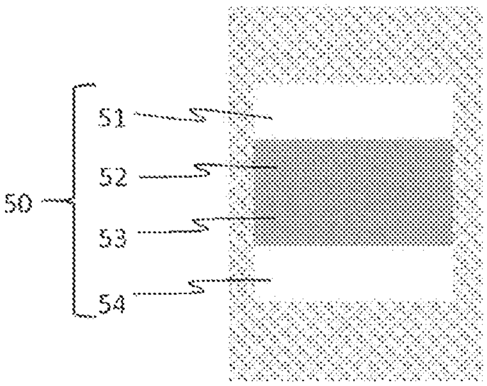
FIGS. 8A, 8B, and 8C are each a view illustrating a case in which bleed occurred.
Figure 8B:
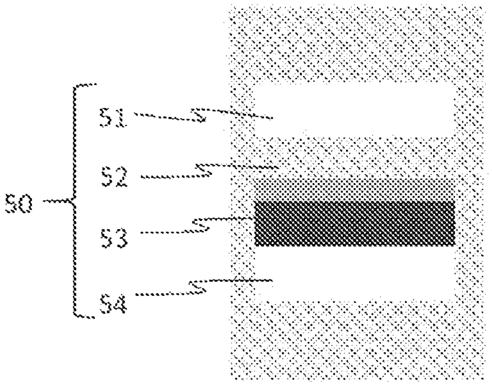
Figure 8C:
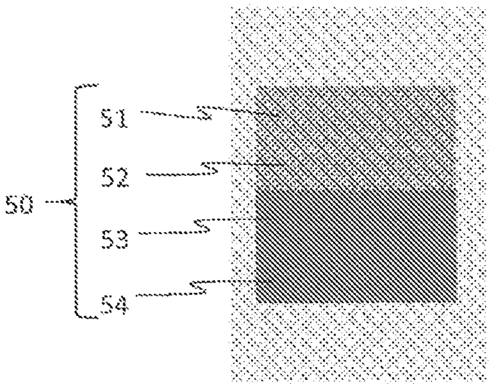

FIGS. 8A, 8B, and 8C each illustrate a case in which bleed occurred in the bleed determination unit 50 in the medium 30. In the case of FIG. 8A, the first element 52 and the second element 53 of the bleed determination unit 50 bleed to merge with each other, making it impossible to distinguish the first element 52 and the second element 53. In the case of FIG. 8B, between the first element 52 and the second element 53 of the bleed determination unit 50, a region of a color that is different from both that of the first element 52 and that of the second element 53 is caused by ink bleed. In the case of FIG. 8C, the first element 52 of the bleed determination unit 50 bleeds, causing the space element 51 to disappear, and the space element 53 bleeds, causing the space element 54 to disappear. The mode of occurrence of bleed in the bleed determination unit 50 is not limited to the cases illustrated in FIGS. 8A, 8B, and 8C. The user can check whether the patch is a non-bleed patch by evaluating the bleed determination unit 50 by visual observation or the like.

Therefore, in step S110 of the second embodiment, the selection receiving unit 12*b* receives both the selection of well color-developed patches and the selection of non-bleed patches input by the user through the operation receiving unit 14. In addition, in step S120, the condition setting unit 12*c* identifies, of the patches of which the selection was received by the selection receiving unit 12*b* in step S110, the patch 40 that falls under both well color-developed patches and non-bleed patches, and of which the ink amount of the first ink group and the ink amount of the second ink are the greatest. The processing after identifying the patch in this manner is as described in the first embodiment.

Again, it is assumed that each of the patches 40 given a circle mark in FIG. 6 is a well color-developed patch. In addition, it is assumed that as a result of evaluating the bleed determination unit 50 of each patch 40, the user selected, for the ink amounts of the CMY inks of the first color mixture pattern 41 and the second color mixture pattern 42, each of the patches 40 having the combination of Ck0 and Ck1, the patches 40 having the combination of Ck1 and Ck2, and the patches 40 having the combination of Ck2 and Ck3 as non-bleed patches. In this case, the patch 40 (Ck2, Ck3, K5) corresponds to the patch 40 that falls under well color-developed patches and non-bleed patches, and of which the ink amount of the first ink group and the ink amount of the second ink are the greatest.

Alternatively, it is assumed that as a result of evaluating the bleed determination unit 50 for each patch 40, the user selected, for the ink amounts of the CMY inks of the first color mixture pattern 41 and the second color mixture pattern 42, each of the patches 40 having the combination of Ck0 and Ck1 and the patches 40 having the combination of Ck1 and Ck2 as non-bleed patches. In this case, rather than the patch 40 (Ck2, Ck3, K5), the patch 40 (Ck1, Ck2, K5) corresponds to the patch 40 that falls under well color-developed patches and non-bleed patches, and of which the ink amount of the first ink group and the ink amount of the second ink are the greatest.

Of course, in the second embodiment as well, rather than selecting and inputting all of the well color-developed patches or selecting and inputting all of the non-bleed patches, the user may select and input only the patch that falls under well color-developed patches and non-bleed patches and of which the ink amount of the first ink group and the ink amount of the second ink are the greatest.

4. Third Embodiment

The third embodiment can be said to be a modified example of the second embodiment. Accordingly, for the third embodiment, description common to the second embodiment is omitted.

Figure 9:
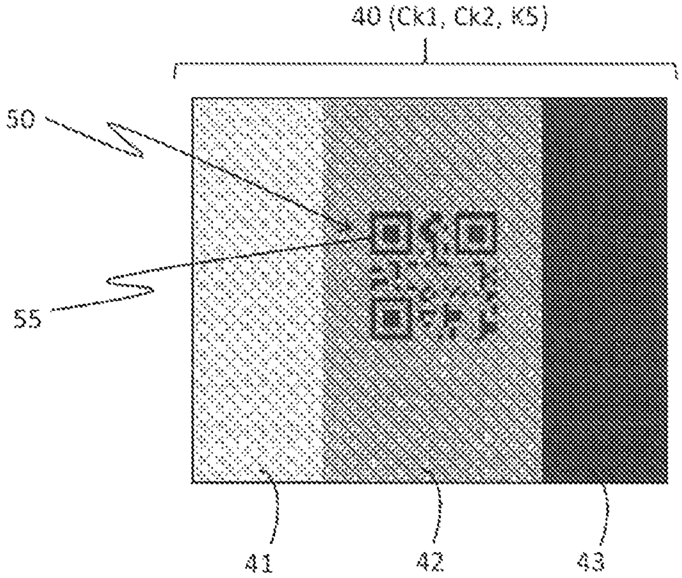
FIG. 9 is a diagram illustrating an example of a patch printed in a medium in a third embodiment.

FIG. 9 illustrates one patch 40 included in the patch group 45 formed in the medium 30 based on the patch image data by step S100. In FIG. 9, only the patch 40 (Ck1, Ck2, K5) is illustrated as a patch 40 including the bleed determination unit 50. As a matter of course, the other patches 40 of the patch group 45 equally include the bleed determination unit 50 as well.

According to FIG. 9, the bleed determination unit 50 according to the third embodiment includes a two-dimensional code 55 formed in the second color mixture pattern 42 of the patch 40 using the second ink. To put it in more detail, the two-dimensional code 55 formed with the K ink corresponds to the "second element"; of the second color mixture pattern 42, the portion that is near the two-dimensional code 55 and in the background of the two-dimensional code 55 corresponds to the "first element"; and the bleed determination unit 50 is constituted by the first element and the second element. The two-dimensional code 55 of the bleed determination unit 50 is a region formed with the same ink amount of the K ink as that of the monochrome pattern 43 of the patch 40 including that bleed determination unit 50. Therefore, the two-dimensional code 55 of the bleed determination unit 50 in the patch 40 (Ck1, Ck2, K5) is formed with the ink amount K5 of the K ink.

Note that the image formation control unit 12*a* may form, as the bleed determination unit 50, the two-dimensional code 55 in the first color mixture pattern 41 using the second ink.

Alternatively, the image formation control unit 12*a* may form, as the bleed determination unit 50, the two-dimensional code 55 in the monochrome pattern 43 corresponding to the second element using the first ink group. In that case, the two-dimensional code 55 as the first element is formed with the same CMY ink amount as that of the second color mixture pattern 42 of the same patch 40.

For each patch 40 of the patch group 45 formed in the medium 30, the user only has to determine whether the patch 40 falls under non-bleed patches based on whether the two-dimensional code 55 of the bleed determination unit 50 was readable. For example, the user captures an image of the two-dimensional code 55 in the patch 40 using a camera of a smartphone, and tries to see whether the information recorded in the two-dimensional code 55 can be correctly read by an application for decoding two-dimensional codes. The contents of the information recorded in the two-dimensional code 55 may be anything. Here, it is assumed that the contents are known to the user or the application.

In the patch 40, when the ink that forms the two-dimensional code 55 and the ink that forms the background of the two-dimensional code 55 are mixed and bleed, the application may fail to read the two-dimensional code. The user only has to select, when the information recorded in the two-dimensional code 55 was successfully correctly read by the application, the patch 40 including that two-dimensional code 55 as a non-bleed patch.

Note that from the viewpoint of determining whether there is bleed based on whether reading can be performed using a camera or an application or by visual observation, the first element or the second element that constitute the bleed determination unit 50 of the third embodiment is not limited to two-dimensional codes, but may be a bar code or may be a specific character string, for example.

Furthermore, in the second embodiment and the third embodiment as well, the bleed determination unit 50 only has to be an image or a region suitable for determining ink bleed, and various modes can be employed.

5. Summary

As described above, according to the present embodiment, the liquid ejecting device 10 capable of ejecting a plurality of types of liquid to the medium 30 includes the liquid ejecting unit 18 including a plurality of nozzles 22 each configured to eject a corresponding liquid of the plurality of types of liquid, and the control unit 11 configured to control ejection of the plurality of types of liquid by the liquid ejecting unit 18. The plurality of types of liquid include a first ink group that is a plurality of color inks and that is capable of expressing a different color by being mixed with each other, and a second ink capable of singly expressing a color of the same system as that of the different color. In addition, the control unit 11 can form in the medium 30 the first color mixture pattern 41 that uses the first ink group and the second color mixture pattern 42 that uses a greater amount of the first ink group than that of the first color mixture pattern 41 by controlling the liquid ejecting unit 18 to eject the first ink group, can form in the medium 30 the monochrome pattern 43 that uses the second ink by controlling the liquid ejecting unit 18 to eject the second ink, and forms in the medium 30 a patch 40 that includes the first color mixture pattern 41, the second color mixture pattern 42, and the monochrome pattern 43 and in which the second color mixture pattern 42 is adjacent to the first color mixture pattern 41 and the monochrome pattern 43.

According to the configuration described above, a patch 40 in which the second color mixture pattern 42 is adjacent to the first color mixture pattern 41 and the monochrome pattern 43 is formed in the medium 30. Therefore, the user can directly compare the density of the first color mixture pattern 41 and the density of the second color mixture pattern 42, and directly compare the density of the second color mixture pattern 42 and the density of the monochrome pattern 43. Accordingly, with ease and high accuracy, whether the color development of the patch 40 is good including the presence or absence of the density reversal phenomenon can be checked, and the ink amount suitable for obtaining a liquid ejection result with good color development can be checked. Furthermore, by forming such a patch 40 in the medium 30, the above-described checks can be performed by visual observation or by utilizing a simple apparatus such as a camera of a smartphone typically owned by the user, without using an apparatus dedicated to colorimetry such as optical densitometers.

Furthermore, according to the present embodiment, the control unit 11 forms a plurality of the patches 40 in the medium 30 along a first direction and forms the n-th patch 40 of the plurality of patches 40 aligned along the first direction using a greater amount of the first ink group compared to that of the n−1-th patch 40.

According to the configuration described above, by increasing the ink amount of the first ink group in each patch 40 stepwise, the correspondence between the presence or absence of the density reversal phenomenon and the ink amount of the first ink group can be easily checked.

Furthermore, according to the present embodiment, the control unit 11 forms a plurality of the patches 40 in the medium 30 along a second direction intersecting the first direction and forms the m-th patch 40 of the plurality of patches 40 aligned along the second direction using a greater amount of the second ink compared to that of the m−1-th patch 40.

According to the configuration described above, by increasing the ink amount of the second ink in each patch 40 stepwise in a direction intersecting the direction in which the ink amount of the first ink group in each patch 40 varies, the highness or lowness in density of the first color mixture pattern 41, the second color mixture pattern 42, and the monochrome pattern 43 can be easily checked for each patch 40.

Furthermore, according to the present embodiment, the control unit 11 may form in the patch 40 the bleed determination unit 50 for determining ink bleed and the bleed determination unit 50 may include a first element formed with the first ink group and a second element formed with the second ink.

According to the configuration described above, patches 40 or ink amounts that satisfy both the condition that color is well developed without the density reversal phenomenon being caused and the condition that there is no bleed can be easily checked.

Furthermore, according to the present embodiment, the control unit 11 may form, as the bleed determination unit 50, a region where four elements adjoin each other in the order of the space element 51 that is a region to which no liquid is ejected, the first element 52, the second element 53, and the space element 54.

According to the configuration described above, by evaluating the space element 51, the first element 52, the second element 53, and the space element 54 that are continuously aligned by visual observation or the like, the presence or absence of bleed can be easily checked.

Furthermore, according to the present embodiment, the control unit 11 may form, as the bleed determination unit 50, the two-dimensional code 55 in the first color mixture pattern 41 or in the second color mixture pattern 42 using the second ink, or form the two-dimensional code 55 in the monochrome pattern 43 using the first ink group.

According to the configuration described above, whether there is bleed can be easily checked based on whether the two-dimensional code 55 can be read.

Furthermore, the control unit 11 may receive the selection of a patch 40 formed in the medium 30, and in accordance with the ink amount corresponding to the selected patch, may determine the ink amount to be employed in subsequent liquid ejection.

According to the configuration described above, the control unit 11 can determine, in accordance with the ink amount of the patch 40 that satisfies the condition of good color development or the like, the appropriate ink amount to be employed in subsequent liquid ejection.

The present embodiment is not limited to a device or a system, and discloses disclosures of a variety of categories such as a method performed by the device or the system, and the program 12 that causes a processor to execute the method.

For example, in a liquid ejecting method performed by the liquid ejecting device 10 capable of ejecting a plurality of types of liquid to the medium 30, the plurality of types of liquid include a first ink group that is a plurality of ink colors and that is capable of expressing a different by being mixed with each other and a second ink capable of singly expressing a color of the same system as the different color, and the liquid ejecting method includes a patch forming step of forming a patch 40 in the medium 30 by controlling the liquid ejecting unit 18 including a plurality of nozzles 22 each configured to eject a corresponding liquid of the plurality of types of liquid. In addition, in the patch forming step, the first color mixture pattern 41 that uses the first ink group and the second color mixture pattern 42 that uses a greater amount of the first ink group than that of the first color mixture pattern 41 can be formed in the medium 30 by controlling the liquid ejecting unit 18 to eject the first ink group, the monochrome pattern 43 that uses the second ink can be formed in the medium by controlling the liquid ejecting unit 18 to eject the second ink, and a patch 40 that includes the first color mixture pattern 41, the second color mixture pattern 42, and the monochrome pattern 43 and in which the second color mixture pattern 42 is adjacent to the first color mixture pattern 41 and the monochrome pattern 43 is formed in the medium 30.

An additional description will be given below concerning the present embodiment.

In step S100, the image formation control unit 12*a* may control the liquid ejecting unit 18 to form only one patch 40 instead of forming the patch group 45 in the medium 30. In other words, the patch 40 formed in the medium 30 need not be plural. For example, when the ink amount of each color ink desired to be used in liquid ejection for image formation is already decided to some extent, the image formation control unit 12*a* can form one patch 40 in the medium 30 using such already decided ink amount, and cause the user to check whether color development or the like of this patch 40 is appropriate.

Specific examples of the first ink group and the second ink are not limited to the combination of the CMY inks that express composite black and the K ink that expresses black. For example, since red (R)-based chromatic colors can be expressed by mixing the M ink and the Y ink, the present embodiment may be applied with the MY inks as the first ink group and the R ink that singly expresses red as the second ink. Combinations of the first ink group and the second ink can be assumed for colors of other various systems such as blue-based and green-based colors.

When the second color mixture pattern is said to be "adjacent" to the first color mixture pattern and the monochrome pattern, the second color mixture pattern may be in contact with the first color mixture pattern and the monochrome pattern, or may be not in contact therewith. Since advantageous effects are exhibited when adjacent patterns are disposed in the vicinity of each other to such a degree that density comparison can be favorably realized even by visual observation, a space may be formed between patterns to the extent that such advantageous effects can be exhibited. Thus, the first color mixture pattern, the second color mixture pattern, and the monochrome pattern need to be disposed in the vicinity of each other to such a degree that these three patterns can be judged to form one set of patches.

In the second embodiment and the third embodiment, the patch 40 of which the ink amount of the first ink group and the ink amount of the second ink are the greatest among the patches 40 selected as well color-developed patches, and the patch 40 of which the ink amount of the first ink group and the ink amount of the second ink are the greatest among the patches 40 selected as non-bleed patches may not match. For example, it is assumed that the patch 40 of which the ink amount of the first ink group and the ink amount of the second ink are the greatest among well color-developed patches is the patch 40 (Ck2, Ck3, K5), and the patch 40 of which the ink amount of the first ink group and the ink amount of the second ink are the greatest among non-bleed patches is the patch 40 (Ck1, Ck2, K5). In such a case, in step S120, the condition setting unit 12*c* may change, in accordance with an attribute of the image, the patch 40 that is used as a reference for condition setting. For example, in printing based on image data that represents a landscape picture, a portrait picture, or the like, richness of color development or color rendition takes precedence over absence of bleed. In printing based on image data that represents text or a document, absence of bleed takes precedence over good color development or the like. Thus, in the case of the above-described examples, in association with an attribute such as a landscape picture or a portrait picture, the condition setting unit 12*c* sets a condition in accordance with the ink amount of the patch 40 (Ck2, Ck3, K5). On the other hand, in association with an attribute such as text or a document, a condition is set in accordance with the ink amount of the patch 40 (Ck1, Ck2, K5). According to such a configuration, after the flowchart of FIG. 3, the image formation control unit 12*a* can employ an optimal ink amount setting corresponding to the attribute of the image represented by the image data, and form an image in the medium 30 by liquid ejection.

The configuration of the liquid ejecting unit 18 is not limited to those described above.

For example, in the liquid ejecting unit 18, the carriage 21 may be capable of reciprocating along the transport direction D2 in addition to the main scanning direction D1.

Alternatively, the liquid ejecting unit 18 may include no carriage 21. In this case, the liquid ejecting head 20 is fixed in the middle of the transport path of the medium 30 provided by the transport unit 17, and includes a nozzle row having a length extending over a range that can cover the width of the medium 30 in the main scanning direction D1 for each type of liquid. In addition, the image formation control unit 12*a* may cause a liquid such as ink to be ejected from the liquid ejecting head 20 to the medium 30 that is being moved during the transport by the transport unit 17.

What is claimed is:

1. A liquid ejecting device configured to eject a plurality of types of liquid to a medium, the liquid ejecting device comprising:

a liquid ejecting unit including a plurality of nozzles each configured to eject a corresponding type of liquid of the plurality of types of liquid; and a control unit configured to control ejection of the plurality of types of liquid by the liquid ejecting unit, wherein the plurality of types of liquid include a first ink group formed of a plurality of color inks and configured to express a different color by mixing the plurality of color inks each other, and a second ink configured to singly express a color of the same system as the different color, and the control unit is configured to form, on the medium, a first color mixture pattern using the first ink group and a second color mixture pattern using a greater amount of the first ink group than that used for the first color mixture pattern, by controlling the liquid ejecting unit to eject the first ink group, is configured to form, on the medium, a monochrome pattern using the second ink, by controlling the liquid ejecting unit to eject the second ink, and forms, on the medium, a patch that includes the first color mixture pattern, the monochrome pattern, and the second color mixture pattern that is adjacent to the first color mixture pattern and the monochrome pattern.

2. The liquid ejecting device according to claim 1, wherein the control unit forms a plurality of the patches on the medium along a first direction, and forms an n-th patch of the plurality of patches aligned along the first direction, by using a greater amount of the first ink group than that used for an n−1-th patch.

3. The liquid ejecting device according to claim 2, wherein the control unit forms the plurality of patches on the medium along a second direction intersecting the first direction, and forms an m-th patch of the plurality of patches aligned along the second direction, by using a greater amount of the second ink than that used for an m−1-th patch.

4. The liquid ejecting device according to claim 1, wherein the control unit forms, in the patch, a bleed determination unit configured to determine ink bleed, and the bleed determination unit includes a first element formed with the first ink group and a second element formed with the second ink.

5. The liquid ejecting device according to claim 4, wherein the control unit forms, as the bleed determination unit, a region in which four elements are adjacent to each other in an order of a space element that is a region to which no liquid is ejected, the first element, the second element, and another space element.

6. The liquid ejecting device according to claim 4, wherein, as the bleed determination unit, the control unit forms a two-dimensional code in the first color mixture pattern or in the second color mixture pattern by using the second ink, or forms a two-dimensional code in the monochrome pattern by using the first ink group.

7. The liquid ejecting device according to claim 1, wherein the control unit receives selection of the patch formed on the medium, and in accordance with an ink amount corresponding to the selected patch, determines an amount of an ink to be used in subsequent liquid ejection.

8. A liquid ejecting method performed by a liquid ejecting device configured to eject a plurality of types of liquid to a medium, the plurality of types of liquid including a first ink group formed of a plurality of color inks and configured to express a different color by mixing the plurality of color inks each other, and a second ink configured to singly express a color of the same system as the different color, the liquid ejecting method comprising a patch forming step of forming a patch on the medium by controlling a liquid ejecting unit that includes a plurality of nozzles each configured to eject a corresponding liquid of the plurality of types of liquid, wherein in the patch forming step, a first color mixture pattern formed by using the first ink group and a second color mixture pattern formed by using a greater amount of the first ink group than that used for the first color mixture pattern are configured to be formed on the medium by controlling the liquid ejecting unit to eject the first ink group, and a monochrome pattern formed by using the second ink is configured to be formed on the medium by controlling the liquid ejecting unit to eject the second ink, and the patch forming step includes forming, on the medium, the patch that includes the first color mixture pattern, the monochrome pattern, and the second color mixture pattern that is adjacent to the first color mixture pattern and the monochrome.

* * * * *